US008517413B2

(12) United States Patent
Chen

(10) Patent No.: US 8,517,413 B2
(45) Date of Patent: Aug. 27, 2013

(54) MOBILE TOOL STAND

(75) Inventor: Jung-Huo Chen, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 108 days.

(21) Appl. No.: 12/707,123

(22) Filed: Feb. 17, 2010

(65) Prior Publication Data

US 2010/0213148 A1 Aug. 26, 2010

Related U.S. Application Data

(60) Provisional application No. 61/154,042, filed on Feb. 20, 2009.

(30) Foreign Application Priority Data

Feb. 20, 2009 (TW) ............................... 98105480 A

(51) Int. Cl.

| | |
|---|---|
| ***B62B 1/00*** | (2006.01) |
| *B60N 2/28* | (2006.01) |
| *B62B 1/06* | (2006.01) |
| *B25B 1/02* | (2006.01) |
| *B23Q 3/02* | (2006.01) |
| *F16M 11/38* | (2006.01) |
| *A47G 29/00* | (2006.01) |

(52) U.S. Cl.
USPC .......... 280/651; 280/47.24; 280/639; 280/30; 414/444; 269/139; 269/136; 248/434; 248/370

(58) Field of Classification Search
USPC .............. 211/195, 85.7, 70.6, 13.1, 200, 201, 211/202; 280/651, 652, 47.24, 30, 35, 38, 280/639, 641, 29, 47.16, 47.17, 47.18, 47.19, 280/47.2, 47.22, 47.25, 47.27, 47.28, 47.33, 280/47.34, 638; 269/139, 134, 137, 16; 248/434, 436, 172, 173, 440, 421, 370, 371, 248/133, 136; 108/115, 118; 414/444
See application file for complete search history.

(56) References Cited

U.S. PATENT DOCUMENTS

| | | | | |
|---|---|---|---|---|
| 150,354 | A * | 4/1874 | Quinn | 108/99 |
| 336,156 | A * | 2/1886 | Pursell | 248/396 |

(Continued)

FOREIGN PATENT DOCUMENTS

| | | |
|---|---|---|
| CN | 2573185 | 9/2003 |
| CN | 2765734 | 3/2006 |

(Continued)

*Primary Examiner* — Joshua J Michener
*Assistant Examiner* — Devin Barnett
(74) *Attorney, Agent, or Firm* — Bacon & Thomas, PLLC

(57) ABSTRACT

A mobile tool stand includes a base frame unit, a support unit connected to the base frame unit for supporting the base frame unit on the floor, and a carrier unit. The carrier unit includes a carrier plate for carrying a machine tool, a pair of links pivotally connected between the carrier plate and the base frame unit and movable relative to the carrier plate to move the stand between a collapsed position and a supporting position, and a pair of coupling rods pivotally connected to the carrier plate and slidingly coupled to the base frame unit, such that the coupling rods are movable in and out of the base frame unit. Thus, the tool that is carried on the carrier plate can be safely moved from place to place when the mobile tool stand is set in the collapsed, transporting condition.

18 Claims, 13 Drawing Sheets

(56) References Cited

U.S. PATENT DOCUMENTS

| | | | | |
|---|---|---|---|---|
| 1,608,924 | A * | 11/1926 | Brown | 108/118 |
| 1,703,282 | A * | 2/1929 | Skinner | 108/118 |
| 2,096,994 | A | 10/1937 | Millen | |
| 2,318,945 | A | 5/1943 | Johannsen | |
| 2,372,003 | A | 3/1945 | Kennedy | |
| 2,609,628 | A * | 9/1952 | Toth | 108/36 |
| 2,675,635 | A * | 4/1954 | Toth | 108/36 |
| 2,733,930 | A * | 2/1956 | Putterman | 280/641 |
| 2,768,866 | A * | 10/1956 | Amber | 108/115 |
| 2,880,047 | A | 3/1959 | Haag | |
| 3,147,748 | A | 9/1964 | Frank | |
| 3,655,212 | A | 4/1972 | Krass et al. | |
| 3,783,799 | A | 1/1974 | Dupuis | |
| 3,805,710 | A * | 4/1974 | Leshem | 108/6 |
| 3,930,663 | A * | 1/1976 | Scripter | 280/654 |
| 4,079,679 | A | 3/1978 | Bechtold | |
| 4,192,480 | A * | 3/1980 | Schmidt | 248/436 |
| 4,202,284 | A | 5/1980 | Parsons, Sr. | |
| 4,248,161 | A * | 2/1981 | Adair et al. | 108/6 |
| 4,373,737 | A * | 2/1983 | Cory et al. | 280/30 |
| 4,483,524 | A | 11/1984 | Basten et al. | |
| 4,558,648 | A | 12/1985 | Franklin et al. | |
| 4,561,336 | A | 12/1985 | Davis | |
| 4,561,622 | A | 12/1985 | Heinzel | |
| 4,586,721 | A * | 5/1986 | Harada et al. | 280/30 |
| 4,611,823 | A * | 9/1986 | Haas | 280/641 |
| 4,726,405 | A | 2/1988 | Bassett | |
| 4,728,118 | A * | 3/1988 | Haas | 280/641 |
| 4,967,672 | A * | 11/1990 | Leather | 108/120 |
| 4,969,496 | A | 11/1990 | Romans | |
| 5,014,628 | A | 5/1991 | Roberts | |
| 5,087,013 | A * | 2/1992 | Gress et al. | 248/676 |
| 5,109,778 | A | 5/1992 | Berkowitz et al. | |
| 5,323,713 | A | 6/1994 | Luyk et al. | |
| 5,325,640 | A | 7/1994 | Luedke et al. | |
| 5,325,794 | A * | 7/1994 | Hontani | 108/117 |
| 5,421,272 | A | 6/1995 | Wilmore | |
| 5,454,575 | A | 10/1995 | Del Buono | |
| 5,484,154 | A * | 1/1996 | Ward | 280/652 |
| 5,560,582 | A * | 10/1996 | Beelen | 248/588 |
| 5,603,491 | A | 2/1997 | Murrell | |
| 5,606,922 | A | 3/1997 | Adams et al. | |
| 5,638,761 | A | 6/1997 | Berkowitz et al. | |
| 5,816,374 | A | 10/1998 | Hsien | |
| 5,862,898 | A | 1/1999 | Chang | |
| 5,863,052 | A | 1/1999 | Roman | |
| 5,934,641 | A | 8/1999 | Vince | |
| 6,019,050 | A * | 2/2000 | Ranta | 108/6 |
| 6,102,369 | A | 8/2000 | Monger | |
| 6,182,935 | B1 | 2/2001 | Talesky | |
| 6,360,797 | B1 | 3/2002 | Brazell et al. | |
| 6,471,220 | B1 | 10/2002 | Babb | |
| 6,578,856 | B2 * | 6/2003 | Kahle | 280/30 |
| 6,607,015 | B1 | 8/2003 | Chen | |
| D486,504 | S | 2/2004 | Huang | |
| 6,722,293 | B2 * | 4/2004 | Lee | 108/118 |
| 6,752,091 | B2 | 6/2004 | Glover et al. | |
| 6,886,836 | B1 * | 5/2005 | Wise | 280/30 |
| 6,892,860 | B2 | 5/2005 | Gibson et al. | |
| 6,899,306 | B1 | 5/2005 | Huang | |
| 6,942,229 | B2 * | 9/2005 | Brazell et al. | 280/30 |
| D519,747 | S * | 5/2006 | Wu | D6/400 |
| 7,044,496 | B2 * | 5/2006 | Holmes | 280/639 |
| D523,041 | S * | 6/2006 | Wise | D15/141 |
| 7,059,616 | B2 * | 6/2006 | Wu | 280/47.24 |
| 7,077,421 | B2 * | 7/2006 | Wu | 280/645 |
| D527,200 | S * | 8/2006 | Wu | D6/400 |
| 7,086,632 | B2 * | 8/2006 | Hsieh | 248/188.1 |
| D529,252 | S * | 9/2006 | Wu | D34/24 |
| 7,213,829 | B2 * | 5/2007 | Wu | 280/645 |
| 7,222,865 | B2 * | 5/2007 | Chen et al. | 280/30 |
| 7,255,355 | B2 * | 8/2007 | Chisholm et al. | 280/30 |
| 7,278,646 | B2 * | 10/2007 | Chuang | 280/47.34 |
| 7,308,858 | B2 | 12/2007 | Lo et al. | |
| 7,334,592 | B2 | 2/2008 | Tartaglia | |
| 7,464,956 | B2 * | 12/2008 | Chen et al. | 280/639 |
| 7,487,947 | B2 * | 2/2009 | Liu et al. | 248/439 |
| 7,494,149 | B2 * | 2/2009 | Liu et al. | 280/639 |
| D594,042 | S * | 6/2009 | Wise | D15/141 |
| 7,681,893 | B2 * | 3/2010 | Liu et al. | 280/35 |
| 7,690,408 | B2 | 4/2010 | Sugiura | |
| 7,849,966 | B2 * | 12/2010 | Chiu | 182/153 |
| 7,882,870 | B2 * | 2/2011 | Lee | 144/286.1 |
| 7,882,871 | B2 | 2/2011 | Gilmour | |
| 2004/0250901 | A1 | 12/2004 | Ursell | |
| 2005/0011421 | A1 | 1/2005 | Zhang | |
| 2005/0045781 | A1 | 3/2005 | Brazell | |
| 2005/0120849 | A1 * | 6/2005 | Lee | 83/471 |
| 2005/0120922 | A1 * | 6/2005 | Brooks | 108/118 |
| 2005/0133682 | A1 | 6/2005 | Huang | |
| 2005/0183559 | A1 | 8/2005 | Rue | |
| 2005/0194215 | A1 * | 9/2005 | Radermacher | 182/181.1 |
| 2005/0199768 | A1 * | 9/2005 | Tam et al. | 248/129 |
| 2006/0011191 | A1 * | 1/2006 | Vavricek | 125/13.01 |
| 2006/0021552 | A1 | 2/2006 | Pleiman et al. | |
| 2006/0021553 | A1 | 2/2006 | Pleiman et al. | |
| 2006/0038383 | A1 * | 2/2006 | Wu | 280/652 |
| 2006/0049614 | A1 * | 3/2006 | Shamah | 280/652 |
| 2006/0071450 | A1 * | 4/2006 | Wu | 280/642 |
| 2006/0075943 | A1 * | 4/2006 | Chen et al. | 108/115 |
| 2006/0076756 | A1 * | 4/2006 | Wu | 280/652 |
| 2006/0145045 | A1 * | 7/2006 | Chisholm et al. | 248/439 |
| 2006/0163441 | A1 | 7/2006 | Wise | |
| 2007/0080488 | A1 * | 4/2007 | Chuang | 269/290 |
| 2007/0102892 | A1 * | 5/2007 | Chiu | 280/35 |
| 2008/0115701 | A1 * | 5/2008 | Sugiura | 108/132 |
| 2008/0203704 | A1 | 8/2008 | McCracken | |
| 2008/0257225 | A1 * | 10/2008 | Chianale | 108/11 |
| 2010/0171290 | A1 | 7/2010 | Wise | |

FOREIGN PATENT DOCUMENTS

| | | | |
|---|---|---|---|
| DE | 26 45 773 | A1 | 4/1978 |
| EP | 0 532 132 | A2 | 3/1993 |
| GB | 2 363 366 | A | 12/2001 |
| TW | 349504 | | 1/1999 |
| TW | 365931 | | 8/1999 |
| TW | M273664 | | 8/2005 |
| TW | M281862 | | 12/2005 |
| TW | M283108 | | 12/2005 |
| TW | M319834 | | 10/2007 |
| TW | I289101 | | 11/2007 |
| WO | WO 03064115 A1 | | 8/2003 |

* cited by examiner

MOBILE TOOL STAND

This application claims the benefit of U.S. Provisional Application No. 61/154,042, filed Feb. 20, 2009.

FIELD OF THE INVENTION

The present invention generally relates to tool stands provided for supporting power tools thereon, and more particularly, to a folding mobile tool stand that can be easily and conveniently set between a collapsed, non-use or storage position, a transporting position, and an extended or supporting position.

BACKGROUND

Machine tools, such as table saws, miter saws, etc., typically have substantial weight associated therewith from the electric motors, and work piece support platforms. Accordingly, in order to facilitate mobility, a large number of tool stands are made to be foldable/collapsible, and/or to include wheel assemblies to allow the tool stand to be easily transported.

An exemplary tool stand is disclosed in Taiwanese publication no. TW I289101. This publication discloses the use of a driving member used to move a link in order to set four wheel assemblies for moving the tool stand along a floor. According to this design, the wheel assemblies must be constructed having a high strength. Additionally, due to the use of four contact points with the floor, there is a high moving resistance to move the stand. Therefore, the use of the four wheel assemblies requires a large amount of moving space.

A detachable tool stand is disclosed in Taiwanese publication no. TW M283108. With this design, however, the tool must be removed from the tool stand before moving the tool stand. Then, after the tool stand has been moved to the desired location, the tool must be reinstalled on the stand again. Thus, this design requires a large amount of labor, and is very time intensive, when it is desired to change the location of the tool installation.

Another design for a tool stand is shown in U.S. Pat. No. 6,607,015. This design is a quick-collapse design in which a U-shaped support member is provided at the bottom side of a tool carrier. The U-shaped support member can be collapsed against and received at the carrier when the support member is not in use. However, this configuration is inconvenient for delivery after removal of the tool from the carrier.

Each of Taiwanese publication no. TW M273664 and U.S. Pat. No. 6,942,229 disclose a tool stand having a wheel assembly positioned at one end thereof. After the support legs are collapsed, the wheel assembly is used to transport the tool stand. During operation to convert the tool stand from the supporting position to the transporting position, the user must first rotate the tool and stand from the horizontal supporting position to a vertical position in which the support legs do not contact the floor. Then, the support legs are folded to a collapsed position. Because the tool is heavier than the support legs, it can be dangerous to rotate the tool from the horizontal to the vertical position, since the center of gravity is position high on the assembly.

SUMMARY

In view of the above discussion, embodiments of a folding mobile tool stand that can be easily and conveniently set between a collapsed, non-use or storage position, a transporting position, and an extended or supporting position. The disclosed embodiments provide ease of operation, high mobility, all while reducing the risk of injury to the user by increasing operational safety.

In an embodiment of a folding mobile tool stand, the stand includes a base frame unit, a support unit and a carrier unit. The base frame unit includes a first end part and a second end part opposite to the first end part. The support unit is connected to the base frame unit and adapted for supporting the base frame unit on a supporting surface, such as a floor. The carrier unit is mounted on the base frame unit, and includes a carrier plate, a pair of links pivotally coupled between the carrier plate and the base frame unit, and a pair of coupling rods pivotally connected to the carrier plate and respectively slidably coupled to the second end part of the base frame unit. Each link comprises a first end pivotally connected to the base frame unit between the first end part and the second end part, and a second end opposite to the first end and pivotally connected to the carrier plate. The second ends of the links are movable between a collapsed position, where the second ends of the links are maintained in proximity to the base frame unit, and an extended position, where the second ends of the links are spaced from the base frame unit. The coupling rods are moved relative to the second end part of the base frame unit when the links are moved from the collapsed position to the extended position.

The disclosed configuration provides the effects that when the links are moved from the extended position to the collapsed position, the supported tool is moved with the carrier plate towards the base frame unit to lower the center of gravity of the assembly, so that the folding mobile tool stand can be safely collapsed in order to reduce storage space

BRIEF DESCRIPTION OF THE DRAWINGS

These and other features, aspects, and advantages of the present invention will become better understood with regard to the following description, appended claims, and accompanying drawings where:

Figure 1:
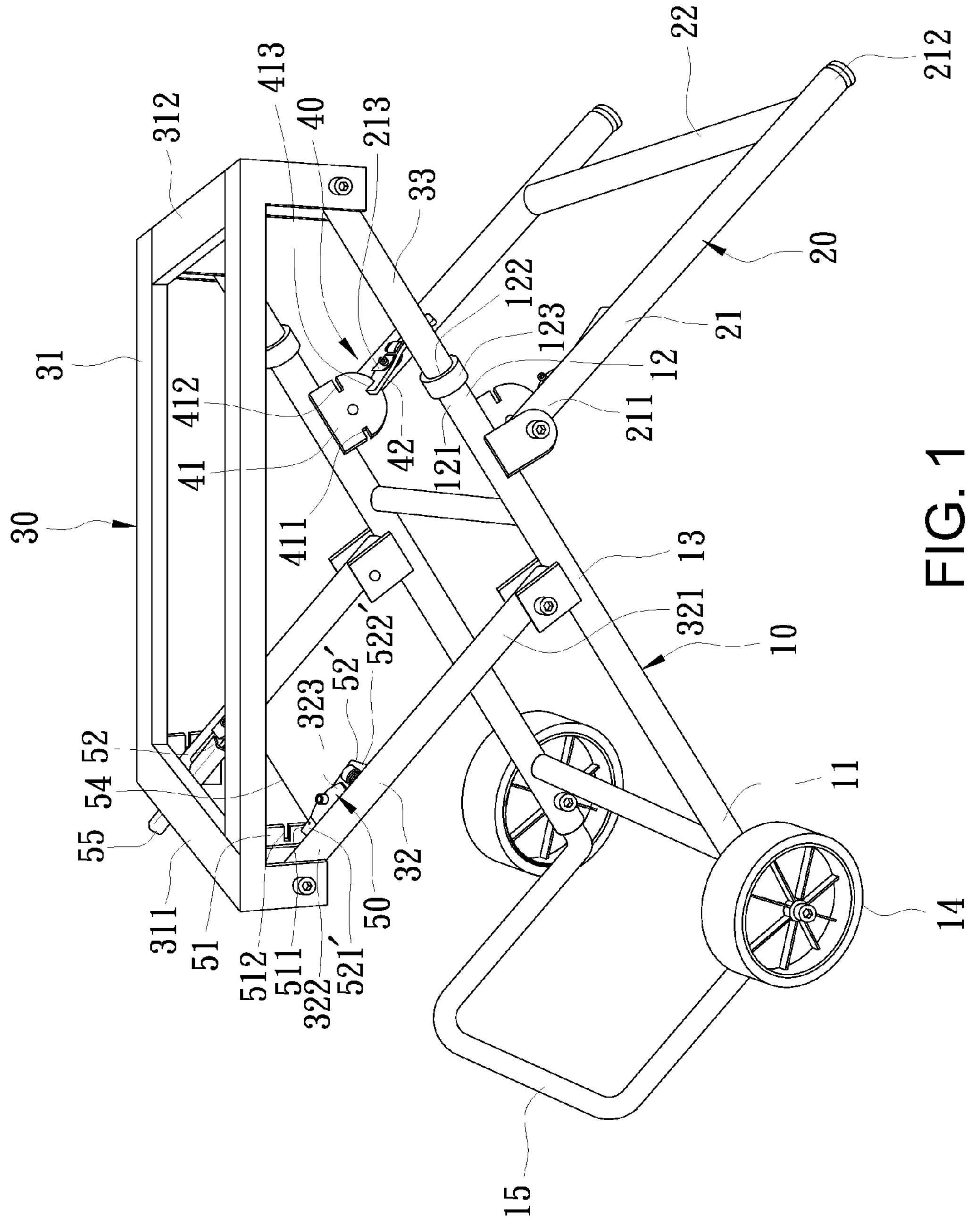
FIG. 1 is an elevational view of a folding mobile tool stand in accordance with an embodiment of the present disclosure.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of a folding tool stand and the components thereof, and in no way limit the structures or configurations of a folding tool stand and components thereof according to the present disclosure.

DETAILED DESCRIPTION

A. Embodiment of a Folding Mobile Tool Stand

An embodiment of a folding mobile tool stand is shown in the drawings.

Figure 2:
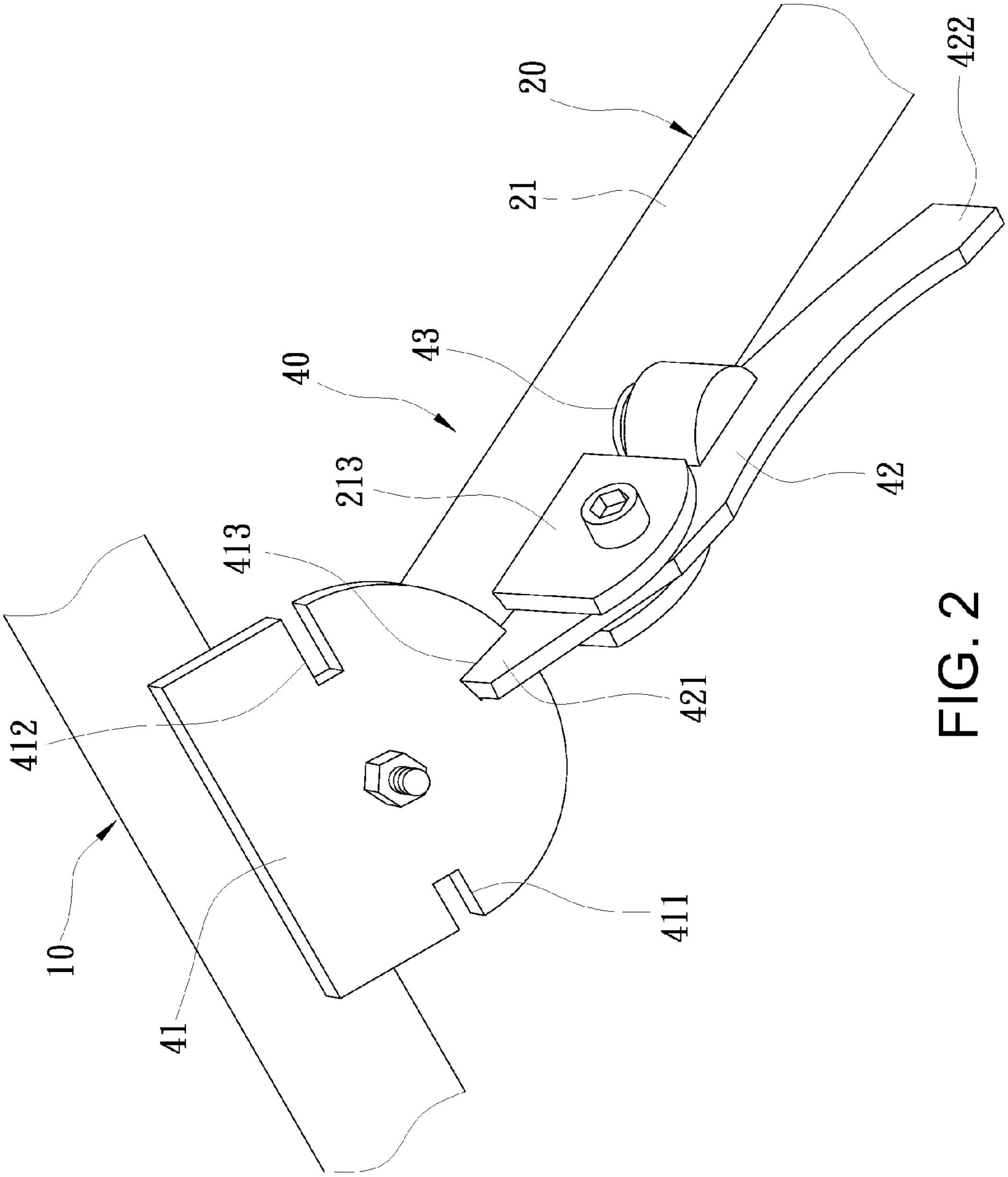
FIG. 2 is a schematic drawing view of a part of the folding mobile tool stand of FIG. 1, showing the arrangement of a first locking unit between the supporting unit and the base frame unit.
Figure 8:
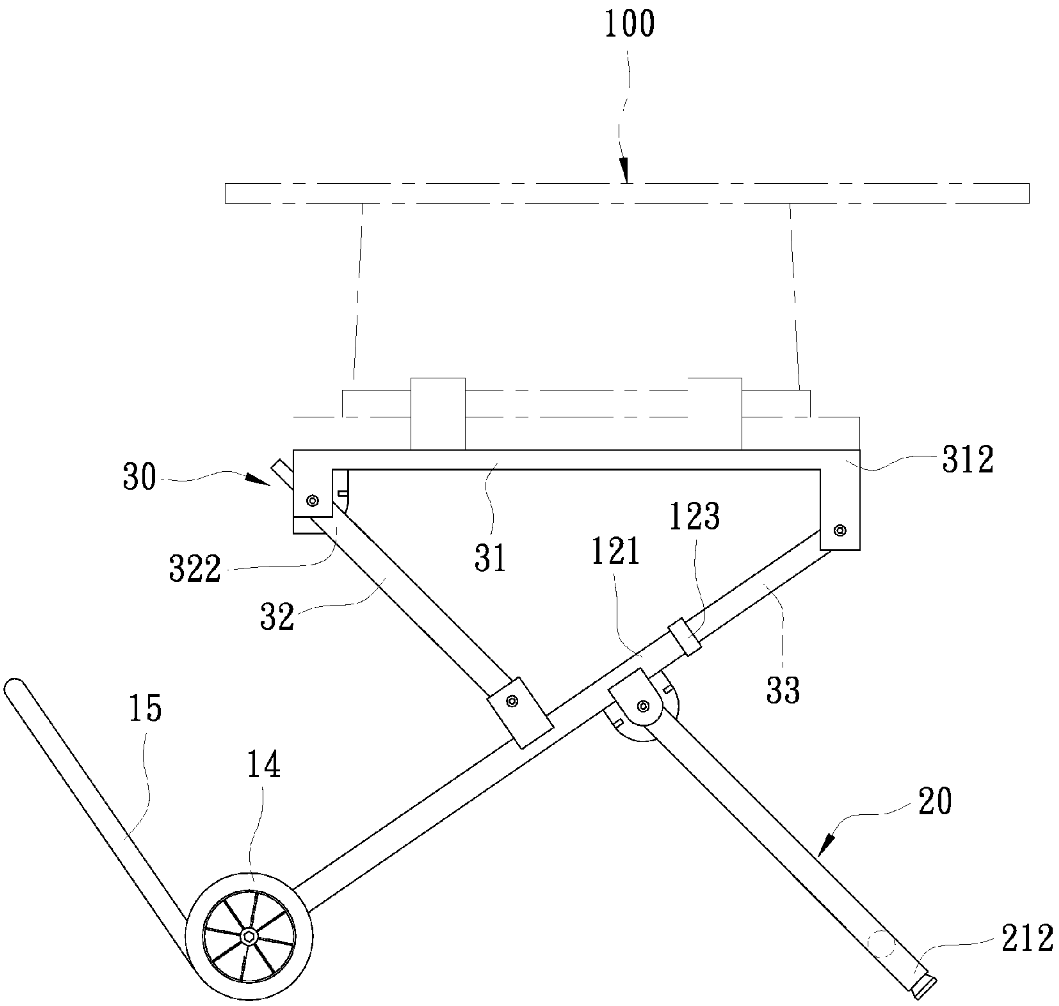
FIG. 8 is a side plan view of the folding mobile tool stand in FIG. 1, showing the stand in the extended position.

In particular, FIGS. 1, 2, and 8 show a folding mobile tool stand that includes a base frame unit 10, a support unit 20 arranged to support the base frame unit 10 on a supporting surface, such as a floor, and a carrier unit 30 mounted on the base frame unit 10 and configured to support a machine tool 100, such as a table saw, miter saw, or other sawing machine, thereon.

A first locking unit 40 is provided at the connection between the support unit 20 and the base frame unit 10 to allow the selectively locking of the support unit 20 in various positions. For example, the support unit 20 can be rotated with respect to the base frame unit 10 from a collapsed, non-use storage position, to an extended supporting position, or to a transporting position.

A second locking unit 50 is located on the carrier unit 30 and allows the selective locking of the carrier unit 30 in a collapsed non-use storage position and/or transporting position, or an extended supporting position.

The base frame unit 10 has a first end part 11, a second end part 12 opposite to the first end part 11, and a middle part 13 positioned between the first end part 11 and the second end part 12.

Rotatable wheels 14 are pivotally mounted on opposite sides of the first end part 11 to allow transporting of the folding mobile tool stand in a manner more fully discussed below. A bumper bar 15 is also fixedly connected to the first end part 11, and extends from the base unit 10 in a generally perpendicular manner.

The second end part 12 of the base unit 10 includes two generally parallel and hollow extension tubes 121. Each extension tube 121 includes an inside hole 122 extending along the length thereof and an end flange 123 positioned around the open side of the inside hole 122 at the second end part 12 of the base unit 10. Reinforcing cross bar members can be provided between the two generally parallel and hollow extension tubes 121 to add rigidity to the folding mobile tool stand.

The support unit 20 connected to the base unit 10 includes two generally parallel support rods 21 with a reinforcing transverse rod 22 positioned between the two support rods 21. Each support rod 21 includes a connection end 211 that is pivotally connected to the base frame unit 10 at the middle part 13 thereof. Each support rod 21 also includes a free end 212, opposite to the connection end 211, the free ends configured to engage a supporting surface when the folding mobile tool stand is in the supporting position.

The carrier unit 30 connected to the base frame unit 10 includes a carrier plate 31 generally shaped like an open rectangular frame. A pair of links 32 is pivotally connected between the carrier plate 31, at a first lateral side 311 thereof, and the middle part 13 of the base frame unit 10. Additionally, a pair of coupling rods 33 is pivotally coupled to a second lateral side 312 of the carrier plate 31. Further, the coupling rods are respectively slidably coupled to the second end part 12 of the base frame unit 10.

As seen in FIG. 1, each link 32 has a first end 321 pivotally connected to the base frame unit 10 at the middle part 13 thereof, and a second end 322, opposite the first end 321, pivotally connected to the first lateral side 311 of the carrier plate 31.

As further seen in FIG. 1, the coupling rods 33 are each generally straight rods configured to be slidably received within the inside holes 122 of the extension tubes 121 of the second end part 12 of the base frame unit 10.

Figure 3:
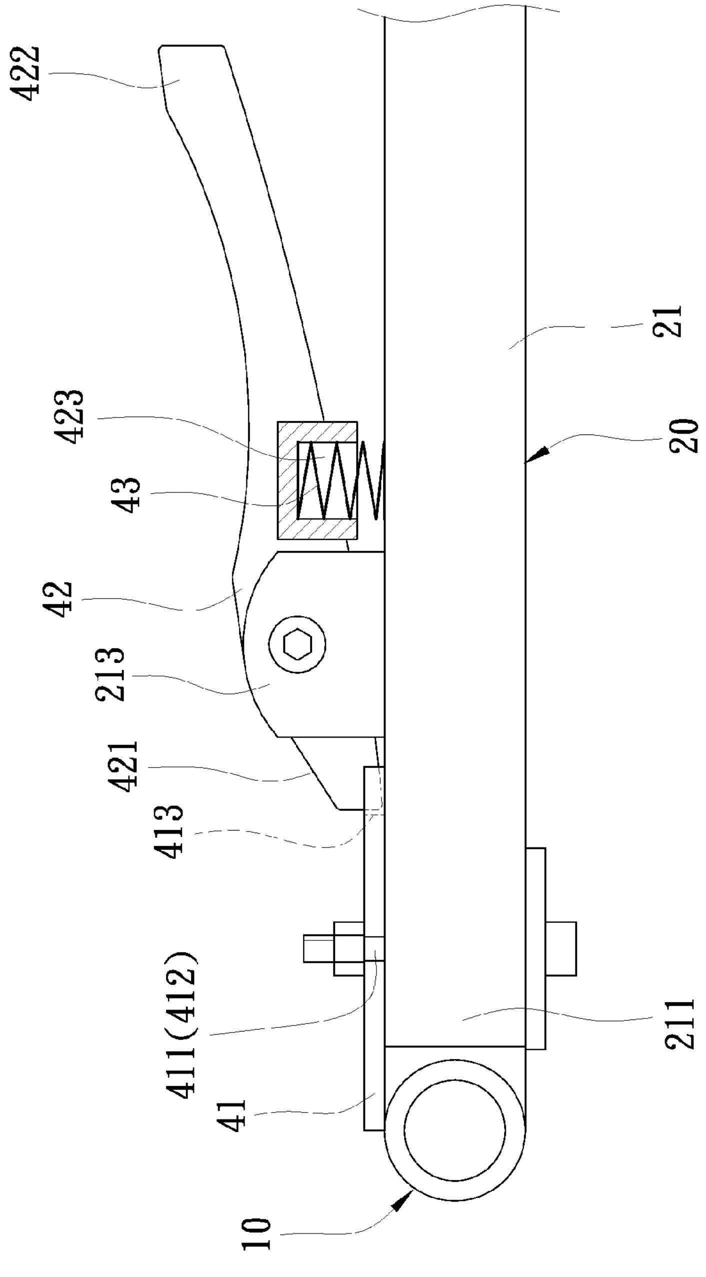
FIG. 3 is a plan view of a part of the folding mobile tool stand of FIG. 1, showing the support unit and the base frame unit locked together by the first locking unit.
Figure 4:
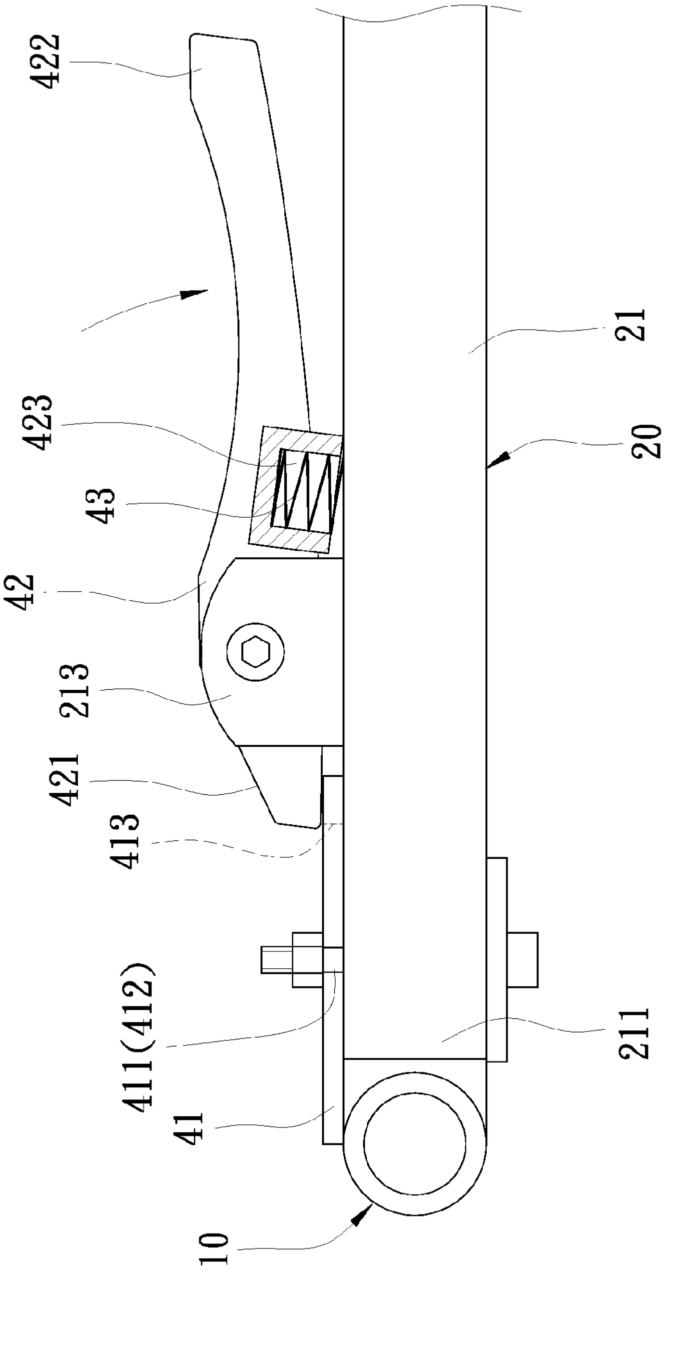
FIG. 4 corresponds to FIG. 3, and shows the locking unit moved to the unlocking position in order to unlock the support unit from the base frame unit.

Turning to FIGS. 2 and 3, the first locking unit 40, which allows the selective locking of the support unit 20 in various positions, is shown in detail. The first locking unit 40 is installed at the connection between the support unit 20 and the base frame unit 10. The first locking unit 40 includes two first locking plates 41 respectively attached to the middle part 13 of the base frame unit 10.

The connection ends 211 of the respective support rods 21 are pivotally connected to the first locking plates 41 so that the support unit 20 can rotate with respect to the base frame unit 10.

Each first locking plate 41 has a first locating hole 411, a second locating hole 412 spaced along the plate 41 from the first locating hole 411 at 180 degrees, and a third locating hole 413 equally spaced between the first locating hole 411 and the second locating hole 412.

First lugs 213 extend from a periphery of the respective connection ends 211 of the support rods 21. First locking bars 42 are pivotally connected to the respective first lugs 213 of the connection ends 211 of the support rods 21. Each first locking bar 42 includes a locking tip 421 that passes through the respective first lug 213 towards the respective first locking plate 41. The locking tip 421 is configured to selectively engage one of the first, second, or third locating holes 411, 412, 413, in order to selectively lock the support unit 20 in one of the three aforementioned positions.

Each first locking bar 42 includes a handle portion 422 located in opposition to the locking tip 421. A first countersunk hole 423 is positioned on each handle portion 422 facing the corresponding support rod 21. Biasing spring members 43 are received within the first countersunk holes 423 and positioned against the respective support rod 21 to bias the locking bars 42 away from the corresponding support rod 21.

Manipulation of the handle portions 422 of locking bars 42 from the biased position, spaced from the support rods 21, causes the locking tips 421 to disengage from the respective locating hole 411, 412, 413, so that the support unit 20 can be rotated with respect to the base frame unit 10. Once the support unit 20 has been rotated to the desired position, the handle portions 422 of the locking bars 42 can be released to the biased position away from the corresponding support rod in order to allow the locking tips 421 to engage the respective locating hole 411, 412, 413.

Figure 5:
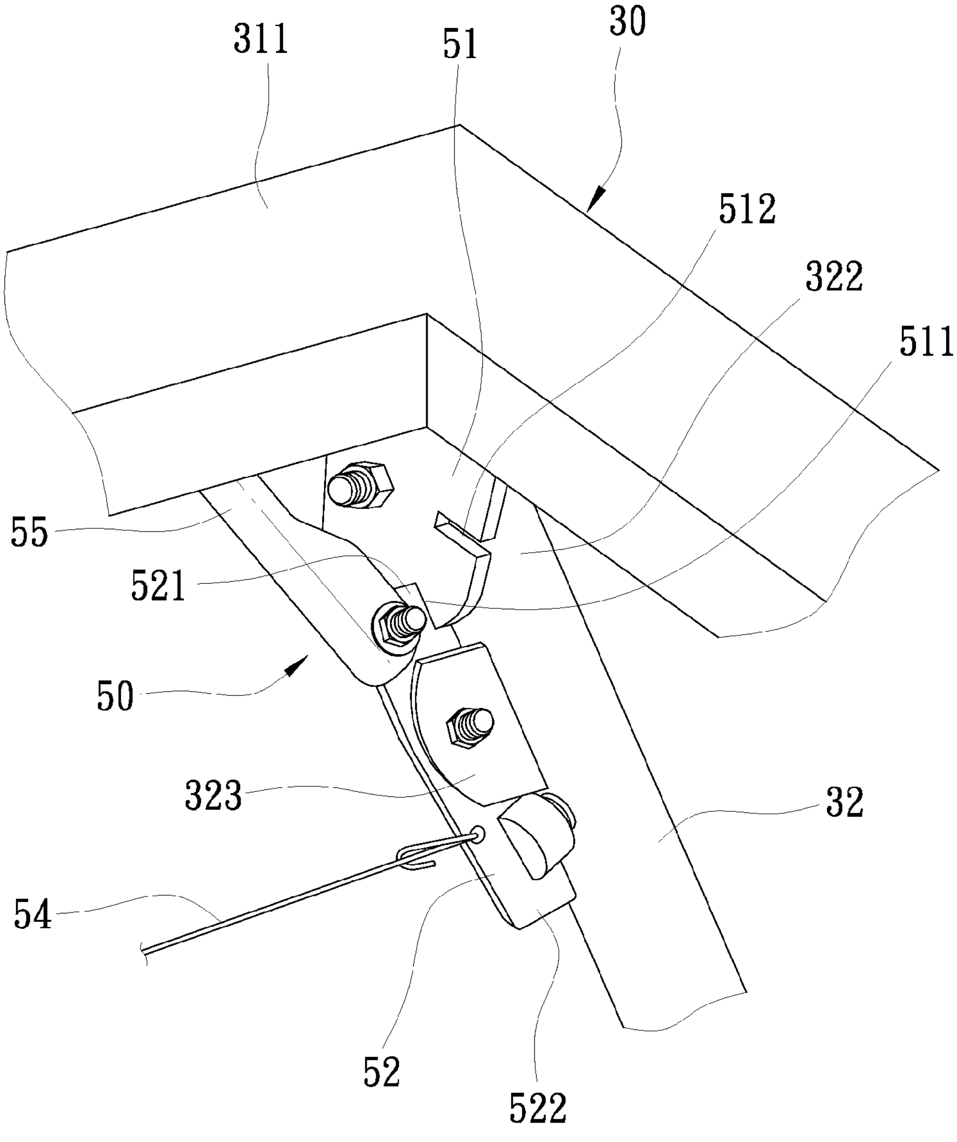
FIG. 5 is an elevational view of another part of the folding mobile tool stand of FIG. 1, showing the arrangement of the second locking unit between the carrier plate and one of the links.
Figure 6:
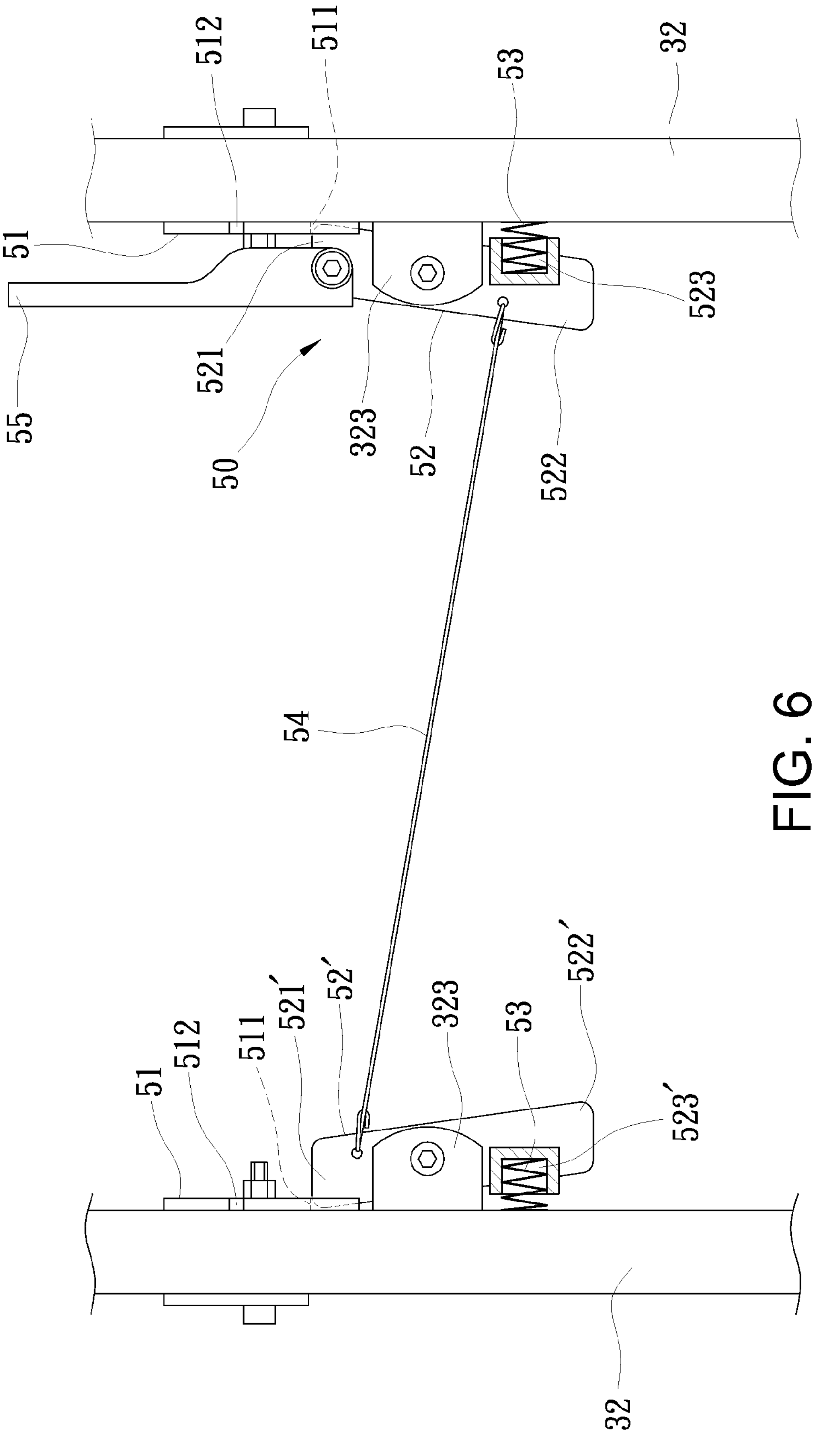
FIG. 6 is schematic plan view showing the configuration of the second locking unit.
Figure 7:
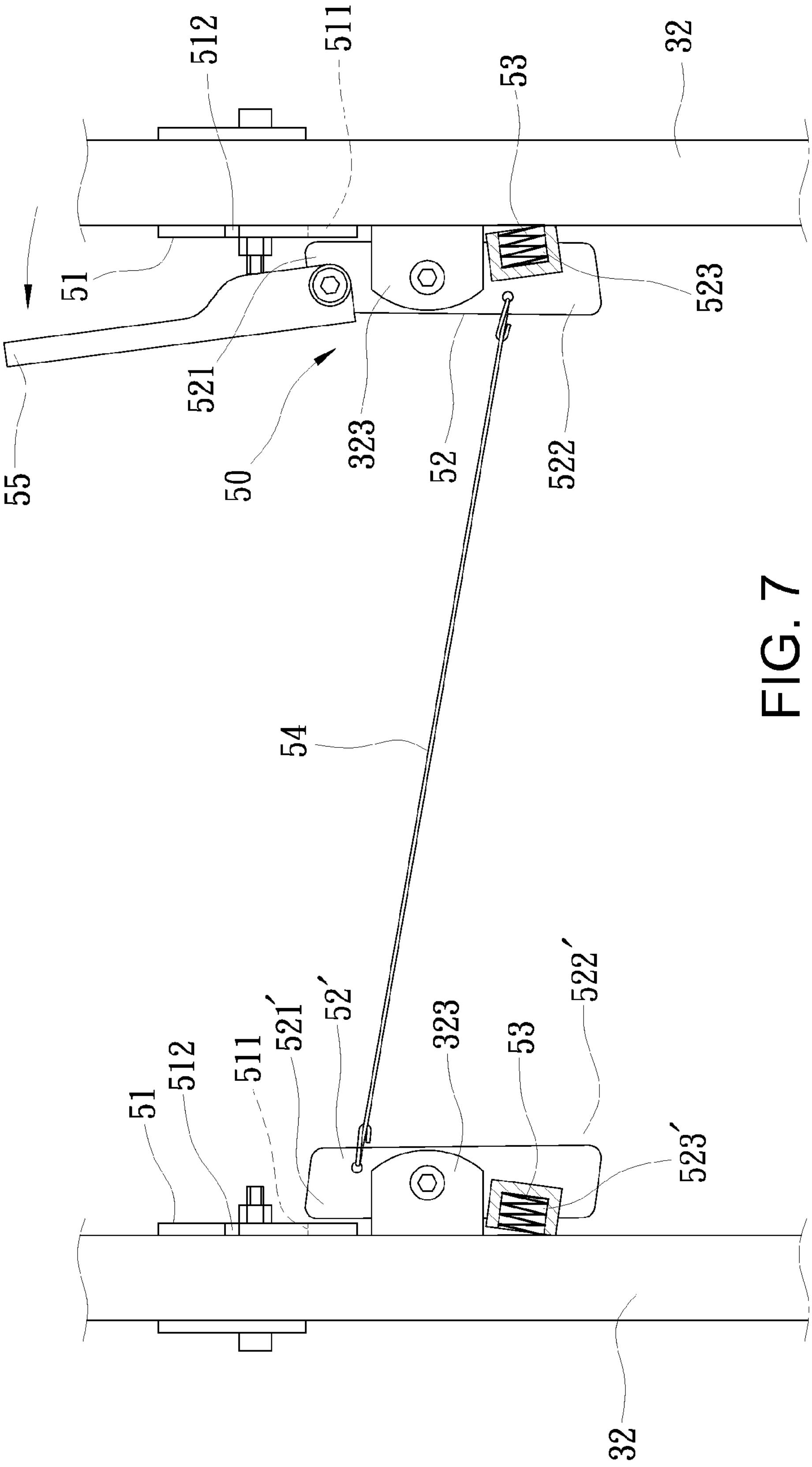
FIG. 7 corresponds to FIG. 6, and shows the actuation of the second locking unit to the unlocked position.

Turning to FIGS. 5 and 6, the second locking unit 50, which allows the selective locking of the carrier unit 30 in various positions, is shown in detail. The second locking unit 50 is installed at the connection between the carrier plate 31 and the links 32. The second locking unit 50 includes two second locking plates 51 respectively attached to the first lateral side 311 of the carrier plate 31.

The second ends 322 of the links 32 are respectively pivotally connected to the locking plates 51, so that the carrier unit 30 can rotate with respect to the base frame unit 10.

Each second locking plate 51 includes a first, centrally positioned, locating hole 511, and a second locating hole 512 disposed at one lateral side relative to the first locating hole 511, towards the carrier plate 31.

Second lugs 323 extend from a periphery of the respective second ends 322 of the links 32. Second locking bars 52, 52' are respectively pivotally coupled to the respective second lugs 323 of the links 32. Each second locking bar 52, 52' includes a locking tip 521, 521' that passes through the respective second lug 323 towards the respective second locking plate 51. The locking tips 521, 521' are configured to selectively engage one of the first and second locating holes 511, 512, in order to selectively lock the carrier unit 30 in one of the aforementioned positions.

Each second locking bar 52 includes a handle portion 522, 522' located in opposition to the locking tip 521, 521'. A second countersunk hole 523, 523' is positioned on the respective handle portion 522, 522' facing the corresponding link 32. Biasing spring members 53 are received within the second countersunk holes 523, 523' and positioned against the respective link 32 to bias the locking bars 52, 52' away from the corresponding link 32.

In a variation from the first locking unit 40, the second locking unit 50 also includes a tether or rope 54 connected between the two second locking bars 52, 52'. In particular, the rope 54 has two distal ends thereof respectively connected to the handle 522 of the second locking bar 52 and the locking tip 521' of the second locking bar 52'. Further, an operating member 55 is fixedly connected to one of the two second locking bars 52, 52'. For example, the operating member 55 is shown connected to the locking tip 521 of the second locking bar 52. The operation of the second locking unit 50 will be described in further detail below.

Turning to FIGS. 1 and 8, in which the folding mobile tool stand is shown in the expanded, supporting position, a tool 100 is mounted on the mobile tool stand for operation thereof. In this position, the free ends 212 of the two support rods 21 of the support unit 20 are spaced apart from the base frame unit 10 and contact the supporting surface/floor to support the base frame unit 10 in a tilted position. At this time, the wheels 14 are also positioned on the floor, such that a four point contact is provided between the mobile tool stand and the floor by way of the wheels 14 and the free ends 212 of the support rods 21 in order to provide a stable supporting platform for the tool 100.

In the supporting position, the locking tips 421 of the two first locking bars 42 are respectively engaged with the third locating holes 413 of the associated first locking plates 41 (FIG. 2) in order to lock the support unit 20 in the supporting position.

Additionally, at this time, the links 32 of the carrier unit 30 are extended, so that the second ends 322 of the links 32 are spaced apart from the base frame unit 10. The locking tips 521, 521' of the second locking bars 52, 52' are respectively engaged with the first locating holes 511 of the second locking plate 51 (FIG. 5) in order to lock the carrier unit 30 in the supporting position.

Further, in the supporting position, the second lateral side 312 of the carrier plate 31 is also spaced away from the end flanges 123, since the coupling rods 33 are extended out of the extension tubes 121 of the second end part 12 of the base frame unit 10, so that the carrier plate 31 is maintained in a horizontal position to stably support the tool 100.

When it is desired to move the tool 100 from one location to another, the user can manipulate the operating member 55 of the second locking unit 50 to actuate the second locking bar 52. When the operating member 55 is manipulated, by way of the tether or rope 54, both of the second locking bars 52, 52' are moved against the biasing force of the spring members 53 (which are compressed at this time), and relative to the second lugs 323, in order to disengage the locking tips 521, 521' from the first locating holes 511 of the second locking plates 51.

Figure 9:
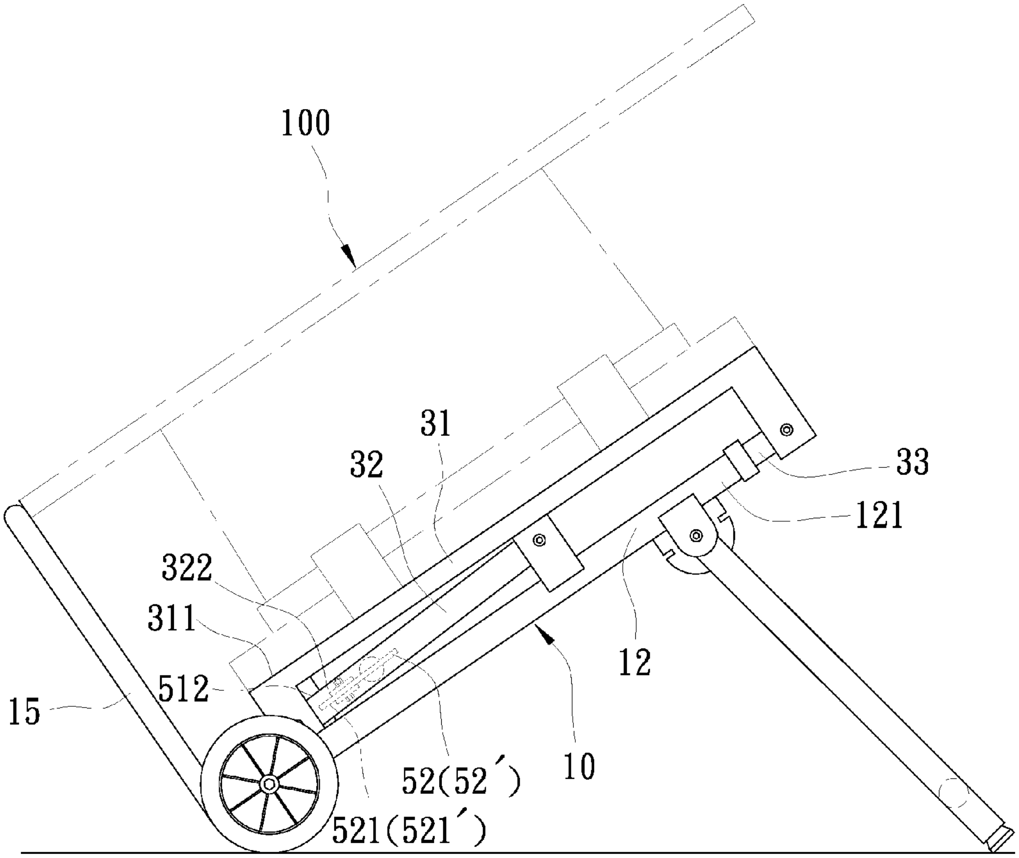
FIG. 9 is a schematic operational view of the folding mobile tool stand in FIG. 1, showing the carrier plate tilted downwards relative to the base frame unit.

With the locking tips 521, 521' disengaged from the first locating holes 511 of the second locking plates 51, the user can manipulate the links 32 to move the links from the extended supporting position to a collapsed, transporting/storage position, where the second ends 322 of the links 32 are positioned against the base frame unit 10, as can be seen in FIG. 9.

At the same time, the coupling rods 33 slide within the extension tubes 121 of the second part 12 of the base frame unit 10, and the carrier plate 31, as well as the tool 100 attached thereto, is tilted downwards against the base frame unit 10, as shown in FIG. 9.

When the carrier unit 30 is thus in the collapsed, transporting/storage position, the locking tips 521, 521' of the second locking bars 52, 52' are respectively engaged within the second locating holes 512 of the second locking plates 51 in order to lock the carrier unit 30 in the collapsed, transporting/storage position, against the base frame unit 10.

Figure 10:
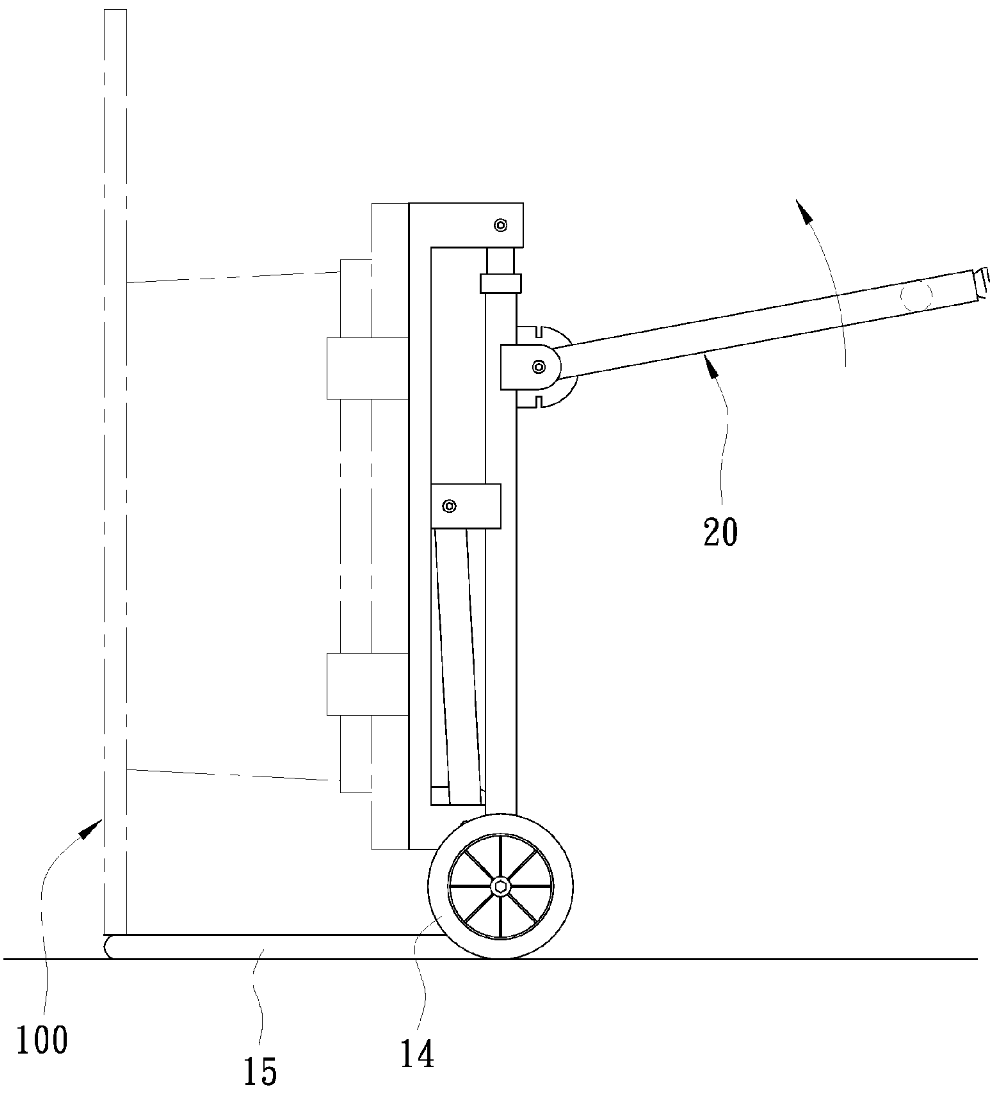
FIG. 10 is a schematic operational view of the folding mobile tool stand in FIG. 1, showing the support unit lifted and the tool and carrier unit with the base frame unit set in a vertical storage position on the floor.

While the carrier unit is thus in the collapsed, transporting/storage position, and in order to adjust the position of the support unit 20, the user can utilize the wheels 14 as a fulcrum, and by lifting the support unit 20, the user can tilt the mobile tool stand into a vertical position, as shown in FIG. 10. In this position, the wheels 14 and the bumper bar 15 can stably support the mobile tool stand in a vertical orientation.

In the vertical position of the mobile tool stand, the user can manipulate the first locking unit 40, as previously discussed, in order to move the support unit 20 from the supporting position, where the first locking tips 421 are engaged within the third locating holes 413 of the first locking plates 41, to either the collapsed, storage position, or the transporting position.

For example, when the handles 422 are simultaneously manipulated against the biasing force of the spring members 43, the locking bars 42 are moved relative to the first lugs 213 in order to disengage the first locking tips 421 from the third locating holes 413 of the first locking plates 41 in order to move the support rods 21 to a transporting, push-pull position (FIG. 11) in which the free ends 212 of the support rods 21 protrude past the second end part 12 of the base frame unit 10. In this transporting, push-pull position, the locking tips 421 of the first locking bars 42 are respectively engaged within the second locating holes 412 of the first locking plates 41 to lock the support unit 20 in the transporting, push-pull position.

Figure 11:
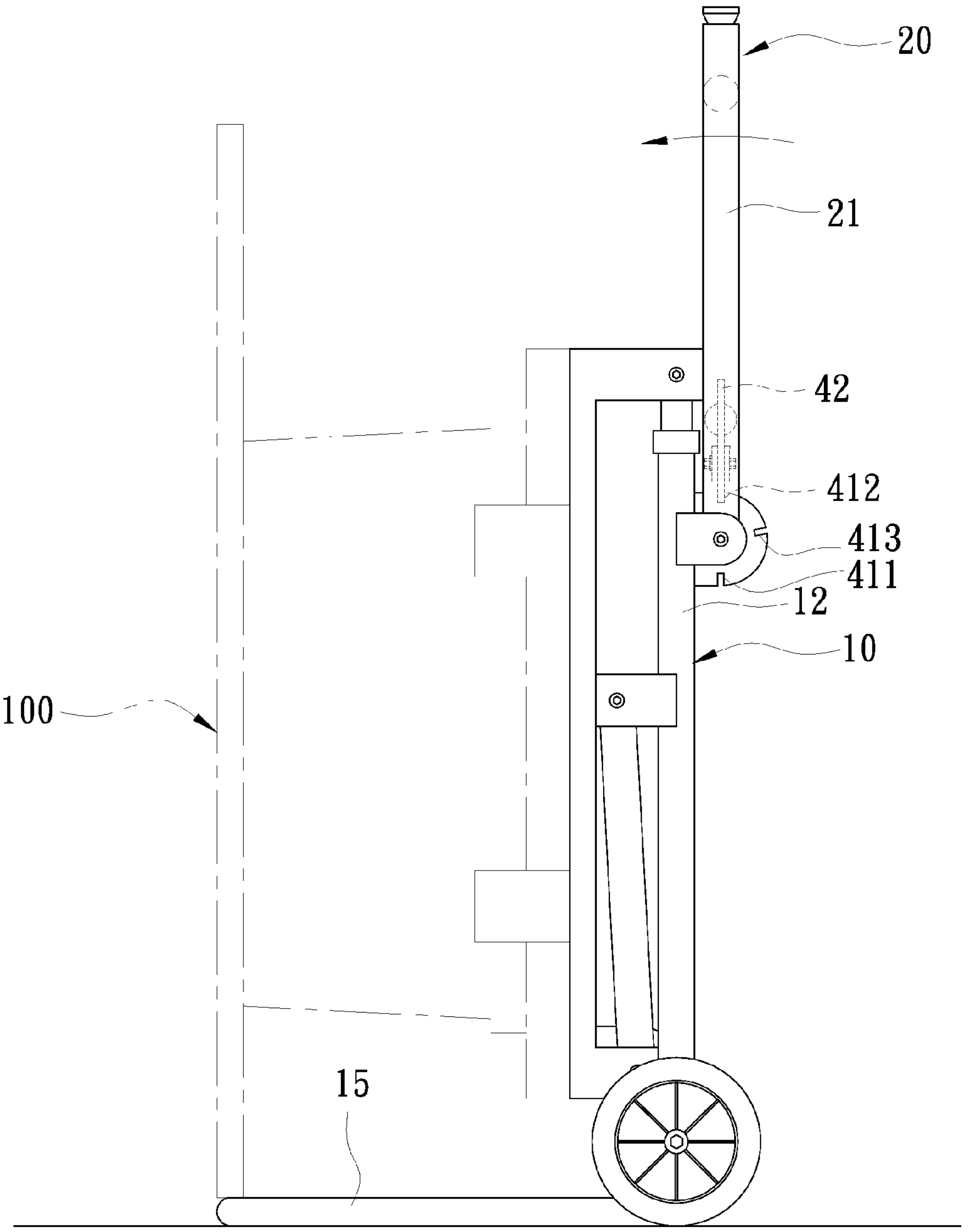
FIG. 11 corresponds to FIG. 10, and shows the support unit rotated relative to the base frame unit to a push-pull position.
Figure 12:
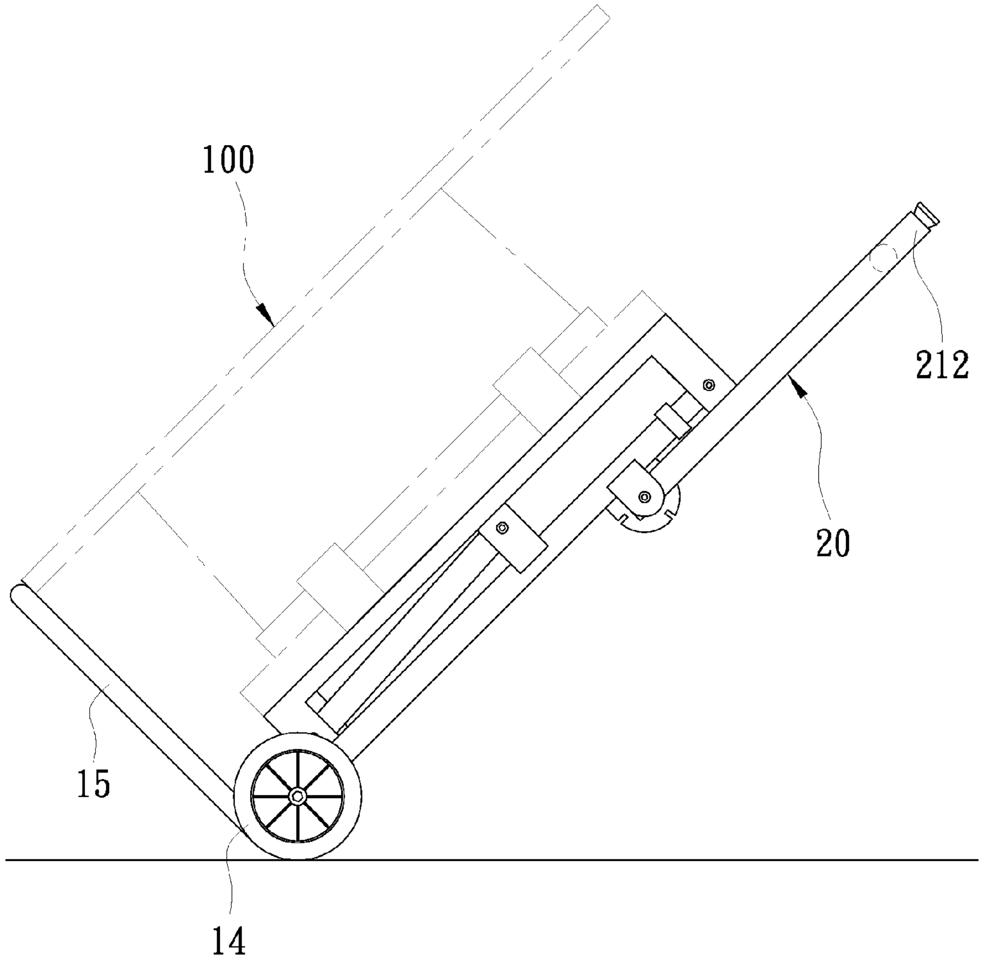
FIG. 12 is a schematic view of the folding mobile tool stand in FIG. 1, showing the mobile tool stand in the transporting position.

The mobile tool stand is shown in the transporting position in FIG. 12, where, when it is desired to move the mobile tool stand, the user utilizes the wheels 14 as a fulcrum in order to tilt the mobile tool stand from the vertical position shown in FIG. 11, by applying a downward force to the supporting unit 20 in order to move the free ends 212 of the support rods 21 downwardly. By maintaining a grip on the support unit 20 in this position, the user can use the support unit 20 as a push-pull handle in order to transport the mobile tool stand, and the tool 100 retained thereon, to another location for use or for storage.

Figure 13:
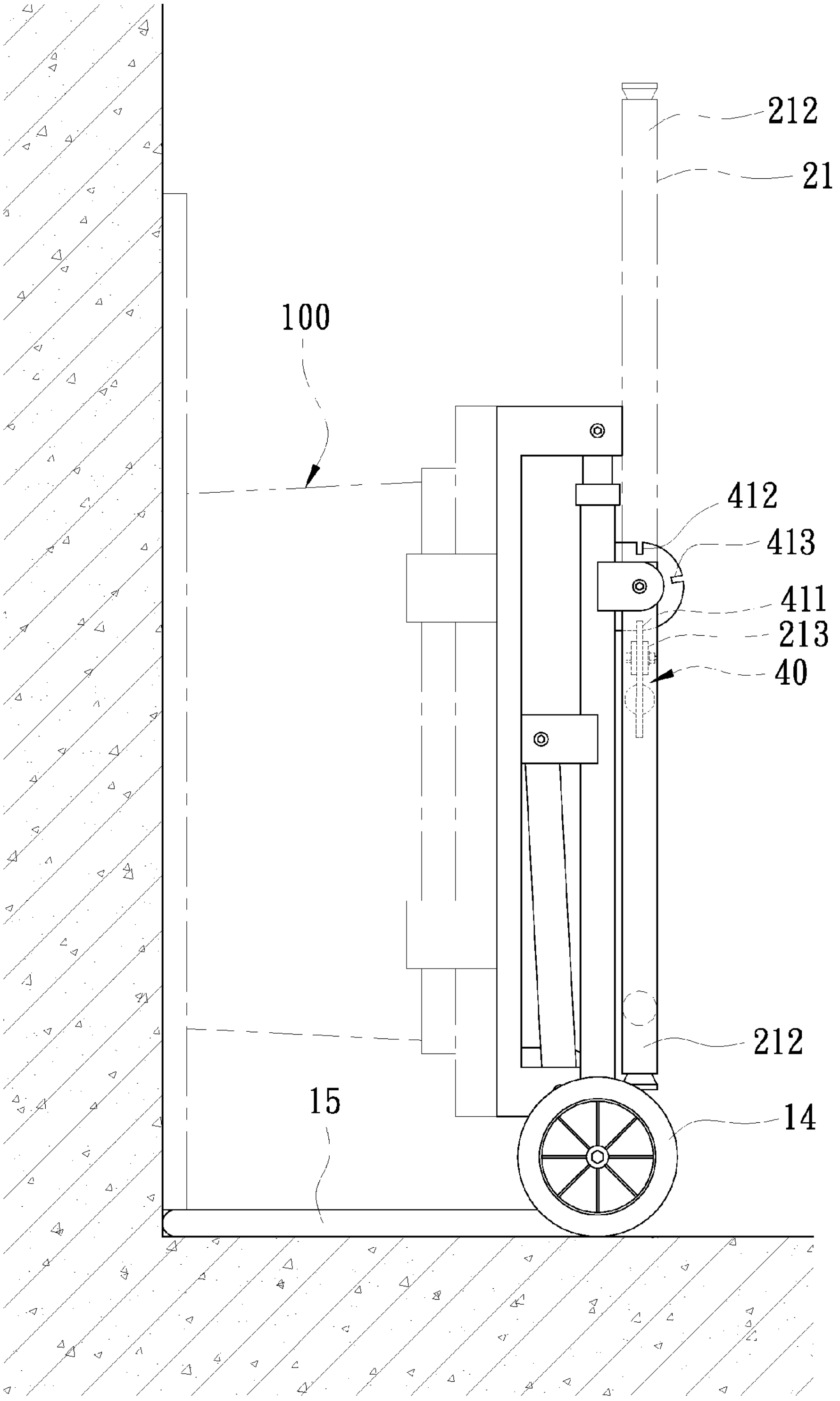
FIG. 13 is a schematic view of the folding mobile tool stand in FIG. 1, showing the mobile tool stand collapsed to a storage position and stored against a vertical wall.

Turning to FIG. 13, once the mobile tool stand with the tool 100 thereon is moved to a predetermined storage position, the stand and tool 100 can be vertically positioned in a corner, and/or against a wall. As previously discussed, the wheels 14 and bumper bar 15 can be used to support the mobile tool stand stably on the floor in the vertical position in this non-use, storage position.

Once the stand is moved to the storage position, the user can manipulate the first locking unit 40 to move the first locking bars 42 relative to the first lugs 213 to disengage the locking tips 421 of the locking bars 42 from the second locating holes 412 of the first locking plates 41. Then, the support rods 21 can be moved from the transporting, push-pull position (shown in broken lines) to the collapsed, non-use, storage position, where the support rods 21 lie generally against the base frame unit 10. In this position, the locking tips 421 of the first locking bars 42 are respectively engaged with the first locating holes 411 of the first locking plates 41, thus locking the support unit 20 into the collapsed, non-use, storage position.

When it is desired to move the 100 from the storage position to an operation position, the support unit 20 is moved from the collapsed position to the push-pull position (FIG. 10) and the base frame unit 10 is tilted (FIG. 9). The stand can then be moved to an operation position, and once situated, the supporting unit 20 can be moved to the supporting position, and the carrier unit 30 is extended to the supporting position (FIG. 8). At this time, the user can operate the tool 100.

In conclusion, the folding mobile tool stand can be conveniently set between the collapsed storage and/or transporting position, and the extended, supporting position. When the mobile tool stand is collapsed, the links 32 are forced to move the carrier plate 31 toward the base frame unit 10 and to lower the center of gravity of the whole mobile tool stand, and then the support unit 20 can be set in the collapsed position. By means of the wheels 14, the collapsed mobile tool stand can be moved smoothly along the floor. Therefore, the mobile tool stand is safe and convenient to use, and requires less storage space when set in the collapsed, storage position.

C. Conclusion

It will be recognized that the folding mobile tool stand and components thereof can be made from any suitable materials.

It is understood that the size of the folding mobile tool stand can be adjusted so that different sized tools can be supported.

It will also be recognized that the position of components provided on one side of the folding mobile tool stand can be switched, or duplicated on the other side of the folding tool stand. For example, the operating member 55 can be provided on the other locking bar 52', and the tether/rope 54 can have its distal ends switched between the handles and locking tips as described.

Of course, it is to be understood that not necessarily all objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The skilled artisan will recognize the interchangeability of various disclosed features from the disclosed embodiments and variations. In addition to variations described herein, other known equivalents for each feature can be mixed and matched by one of ordinary skill in this art to construct a folding mobile tool stand in accordance with principles of the present invention.

Although this invention has been disclosed in the context of exemplary embodiments and examples, it therefore will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

What is claimed is:

1. A mobile tool stand comprising:

a base frame unit having a first end part, a second end part opposed to the first end part, and a middle part positioned therebetween;

a support unit connected to the base frame unit and adapted for supporting the base frame unit; and a carrier unit mounted on the base frame unit and having a carrier plate, a pair of fixed-length links pivotally connected to two corners of a first lateral side of the carrier plate and to the middle part of the base frame unit, and a pair of coupling rods pivotally connected to two corners of a second lateral side of the carrier plate, and telescopically coupled to the second end part of the base frame unit such that the second lateral side of the carrier plate is both freely pivotable and axially slidable relative to the base frame unit;

wherein each link includes a first end pivotally connected to the base frame unit at the middle part thereof, and a second end opposed to the first end and pivotally connected to two corners of the first lateral side of the carrier plate, and the second ends of the links are movable between a collapsed position, where the second ends of the links are maintained in proximity to the base frame unit, and an extended position, where the second ends of the links are spaced from the base frame unit, and the coupling rods are moved relative to the second end part of the base frame unit when the links are moved between the collapsed position and the extended position;

wherein when the mobile tool stand is collapsed, the links are forced to move the carrier plate toward the base frame unit and the carrier plate is forced to move the coupling rods axially relative to the base frame unit in order to lower the center of gravity of the mobile tool stand, and then the support unit can be set in a collapsed position.

2. The mobile tool stand according to claim 1, wherein the second end part of the base frame unit comprises:

two generally parallel hollow extension tubes, each having an inner hole extending along the length thereof, and an end flange arranged around an open side of the inner hole; and the coupling rods are generally straight rods respectively slidably inserted into the inner holes of the extension tubes;

wherein the second lateral side of the carrier plate is configured to move closer to the end flanges of the extension tubes when the second ends of the links move to the collapsed position, and the second lateral side of the carrier plate is configured to move away from the end flanges of the extension tubes when the second ends of the links move to the extended position.

3. The mobile tool stand according to claim 2, wherein the support unit comprises:

a connection end pivotally connected to the base frame unit at the middle part thereof;

a free end opposed to the connection end, and movable between a collapsed position, against the base frame unit, and an extended supporting position arranged to support the stand on a supporting surface.

4. The mobile tool stand according to claim 3, wherein the free end of the support unit is further movable to a push-pull position opposite to the collapsed position where the free end protrudes over the second end part of the base frame unit.

5. The mobile tool stand according to claim 4, wherein the support unit comprises:

two support rods, each having a connection end and a free end; and the mobile tool stand further includes a first locking unit installed between the base frame unit and the support rods, the first locking unit having;

two first locking plates respectively affixed to the base frame unit to which the connection ends of said support rods are pivotally connected, and each having a plurality of locating holes;

two first locking bars respectively pivotally connected to the support rods, a locking tip for engaging one of the locating holes of the associated locking plate, and a handle opposed to the locking tip; and two spring members, respectively mounted between the handles of the first locking bars and the support rods;

wherein the locking tips of the first locking bars are selectively engaged within the respective locating holes of the first locking plates when the free ends of the support rods are set in one of the extended position, received position and push-pull position.

6. The mobile tool stand according to claim 5, wherein the carrier unit further comprises:

a second locking unit mounted between the carrier plate and the links, the second locking unit having;

two second locking plates respectively affixed to the carrier plate, to which the second ends of the links are pivotally connected, and having a plurality of locating holes;

two second locking bars respectively pivoted to the second ends of said links, and having a locking tip for engaging one of the locating holes of the associated second locking plate, and a handle opposed to the locking tip; and two spring members mounted between the handles of the second locking bars and the links;

wherein the locking tips of the second locking bars are selectively engaged within the locating holes of the second locking plates when the second ends of the links are set in one of the extended position and the collapsed position.

7. The mobile tool stand according to claim 5, wherein the plurality of locating holes includes a first locating hole, a second locating hole positioned 180 degrees from the first locating hole, and a third locating hole positioned between the first and second locating holes.

8. The mobile tool stand according to claim 1, wherein the support unit comprises:

a connection end pivotally connected to the base frame unit at the middle part thereof, and a free end opposed to the connection end, the free end movable between a collapsed position, where the free end is abutted against the base frame unit, and an extended position, where the free end is maintained spaced from the base frame unit and arranged to abut a supporting surface.

9. The mobile tool stand according to claim 8, wherein the free end of the support unit is moveable to a push-pull position opposed to the collapsed position, where the free end protrudes over the second end part of the base frame unit.

10. The mobile tool stand according to claim 9, wherein the support unit comprises:

two support rods, each having a connection end and a free end; and the mobile tool stand further includes a first locking unit installed between the base frame unit and the support rods, the first locking unit having;

two first locking plates respectively affixed to the base frame unit to which the connection ends of said support rods are pivotally connected, and each having a plurality of locating holes;

two first locking bars respectively pivotally connected to the support rods, a locking tip for engaging one of the locating holes of the associated locking plate, and a handle opposed to the locking tip; and two spring members, respectively mounted between the handles of the first locking bars and the support rods;

wherein the locking tips of the first locking bars are selectively engaged within the respective locating holes of the first locking plates when the free ends of the support rods are set in one of the extended position, received position and push-pull position.

11. The mobile tool stand according to claim 10, wherein the carrier unit further comprises:

a second locking unit mounted between the carrier plate and the links, the second locking unit having;

two second locking plates respectively affixed to the carrier plate, to which the second ends of the links are pivotally connected, and having a plurality of locating holes;

two second locking bars respectively pivoted to the second ends of said links, and having a locking tip for engaging one of the locating holes of the associated second locking plate, and a handle opposed to the locking tip; and two spring members mounted between the handles of the second locking bars and the links;

wherein the locking tips of the second locking bars are selectively engaged within the locating holes of the second locking plates when the second ends of the links are set in one of the extended position and the collapsed position.

12. The mobile tool stand according to claim 9, wherein the plurality of locating holes includes a first locating hole, a second locating hole positioned 180 degrees from the first locating hole, and a third locating hole positioned between the first and second locating holes.

13. The mobile tool stand according to claim 1, further comprising a pair of wheels rotatably mounted to the first end of the base frame unit.

14. The mobile tool stand according to claim 1, further comprising a bumper bar extending generally perpendicularly from the first end of the base frame unit.

15. The mobile tool stand according to claim 1, wherein each of the links has a same fixed length in both the collapsed and extended positions.

16. The mobile tool stand according to claim 1, wherein the carrier plate is shaped generally as an open rectangular frame.

17. A mobile tool stand comprising:

a base frame unit having a first end part, a second end part opposed to the first end part, and a middle part positioned therebetween;

a support unit connected to the base frame unit and adapted for supporting the base frame unit and having two support rods, each having a connection end and a free end;

a first locking unit installed between the base frame unit and the support rods, the first locking unit having two first locking plates respectively affixed to the base frame unit to which the connection ends of said support rods are pivotally connected, and each having a plurality of locating holes, two first locking bars respectively pivotally connected to the support rods, a locking tip for engaging one of the locating holes of the associated locking plate, and a handle opposed to the locking tip and two spring members, respectively mounted between the handles of the first locking bars and the support rods; and wherein the locking tips of the first locking bars are selectively engaged within the respective locating holes of the first locking plates when the free ends of the support rods are set in one of the extended position, received position and push-pull position; and a carrier unit mounted on the base frame unit and having a carrier plate, a pair of links pivotally connected between a first lateral side of the carrier plate and the base frame unit, and a pair of coupling rods pivotally coupled to a second lateral side of the carrier plate, and telescopically coupled to the second end part of the base frame unit;

a second locking unit mounted between the carrier plate and the links, the second locking unit having two second locking plates respectively affixed to the carrier plate, to which the second ends of the links are pivotally connected, and having a plurality of locating holes, two second locking bars respectively pivoted to the second ends of said links, and having a locking tip for engaging one of the locating holes of the associated second locking plate, and a handle opposed to the locking tip, two spring members mounted between the handles of the second locking bars and the links, and a rope connected between the second locking bars, and having two distal ends respectively connected to the handle of one of the second locking bars and the locking tip of the other of the second locking bars;

wherein each link includes a first end pivotally connected to the base frame unit at the middle part thereof, and a second end opposed to the first end and pivotally connected to the carrier plate, and the second ends of the links are movable between a collapsed position, where the second ends of the links are maintained in proximity to the base frame unit, and an extended position, where the second ends of the links are spaced from the base frame unit, and the coupling rods are moved relative to the second end part of the base frame unit when the links are moved between the collapsed position and the extended position;

wherein when the mobile tool stand is collapsed, the links are forced to move the carrier plate toward the base frame unit and the carrier plate is forced to move the coupling rods axially relative to the base frame unit in order to lower the center of gravity of the mobile tool stand, and then the support unit can be set in a collapsed position.

18. A mobile tool stand comprising:

a base frame unit having a first end part, a second end part opposed to the first end part, and a middle part positioned therebetween;

a support unit connected to the base frame unit and adapted for supporting the base frame unit and having two support rods, each having a connection end and a free end;

a first locking unit installed between the base frame unit and the support rods, the first locking unit having two first locking plates respectively affixed to the base frame unit to which the connection ends of said support rods are pivotally connected, and each having a plurality of locating holes, two first locking bars respectively pivotally connected to the support rods, a locking tip for engaging one of the locating holes of the associated locking plate, and a handle opposed to the locking tip and two spring members, respectively mounted between the handles of the first locking bars and the support rods; and wherein the locking tips of the first locking bars are selectively engaged within the respective locating holes of the first locking plates when the free ends of the support rods are set in one of the extended position, received position and push-pull position; and a carrier unit mounted on the base frame unit and having a carrier plate, a pair of links pivotally connected between a first lateral side of the carrier plate and the base frame unit, and a pair of coupling rods pivotally coupled to a second lateral side of the carrier plate, and telescopically coupled to the second end part of the base frame unit;

a second locking unit mounted between the carrier plate and the links, the second locking unit having two second locking plates respectively affixed to the carrier plate, to which the second ends of the links are pivotally connected, and having a plurality of locating holes, two second locking bars respectively pivoted to the second ends of said links, and having a locking tip for engaging one of the locating holes of the associated second locking plate, and a handle opposed to the locking tip, two spring members mounted between the handles of the second locking bars and the links, and a rope connected between the second locking bars, and having two distal ends respectively connected to the handle of one of the second locking bars and the locking tip of the other of the second locking bars;

an operating member fixedly connected to the locking tip of one the second locking bars;

wherein each link includes a first end pivotally connected to the base frame unit at the middle part thereof, and a second end opposed to the first end and pivotally connected to the carrier plate, and the second ends of the links are movable between a collapsed position, where the second ends of the links are maintained in proximity to the base frame unit, and an extended position, where the second ends of the links are spaced from the base frame unit, and the coupling rods are moved relative to the second end part of the base frame unit when the links are moved between the collapsed position and the extended position;

wherein when the mobile tool stand is collapsed, the links are forced to move the carrier plate toward the base frame unit and the carrier plate is forced to move the coupling rods axially relative to the base frame unit in order to lower the center of gravity of the mobile tool stand, and then the support unit can be set in a collapsed position.

* * * * *